April 7, 1942. B. S. GARVEY ET AL 2,278,777
COMPOSITE ARTICLE AND METHOD FOR MAKING SAME
Filed Oct. 7, 1939
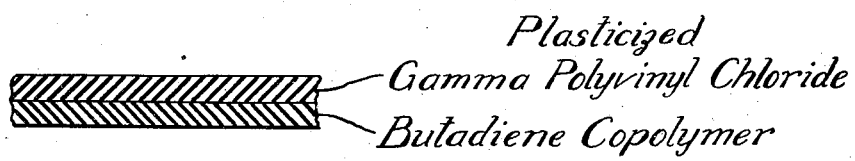
Plasticized
Gamma Polyvinyl Chloride
Butadiene Copolymer
Inventors
Benjamin S. Garvey
Donald E. Henderson
By Willis J. Hoery
Atty Patented Apr. 7, 1942

2,278,777

UNITED STATES PATENT OFFICE 2,278,777

COMPOSITE ARTICLE AND METHOD FOR MAKING SAME

Benjamin S. Garvey and Donald E. Henderson, Akron, Ohio, assignors to The B. F. Goodrich Company, New York, N. Y., a corporation of New York Application October 7, 1939, Serial No. 298,473

4 Claims. (Cl. 154—2)

This invention relates to composite articles and to a method of making the same.

Polyvinyl halides do not in general exhibit the adhesive properties which characterize certain other vinyl resins. This lack of adhesiveness is especially pronounced in the case of plasticized polyvinyl halides such as the plasticized gamma polyvinyl chlorides described in U. S. Patent 1,929,453 issued to Waldo L. Semon, for the plasticizers employed in making such compositions are often oily liquids which even interfere with the adhesion of materials normally useful as adhesives.

We have discovered that polyvinyl halides may be adhered directly to copolymers of butadiene and an unsaturated nitrile having the structural formula $$CH_2=C-CN$$
$$\phantom{CH_2=C-}|$$
$$\phantom{CH_2=C-}R$$

wherein R represents a member of the class consisting of hydrogen and alkyl groups if a vulcanizable copolymer composition is vulcanized in contact with a polyvinyl halide surface. Typical examples of unsaturated nitriles which may be copolymerized with butadiene include acrylic nitrile, alpha-methacrylic nitrile, alpha-ethacrylic nitrile, alpha-isopropylacrylic nitrile, etc.

The copolymers of butadiene and acrylic nitrile are a well known kind of synthetic rubber. It has been found that in general the rubbers formed by polymerizing mixtures containing from 10 to 35% of acrylic nitrile possess the greatest utility, although compositions outside this range are known and may be adhered to polyvinyl halides by the method of this invention.

Although this invention finds its greatest use at the present time in the adhesion of copolymers to plasticized gamma polyvinyl chloride because of its great commercial importance, the method is equally applicable to other polyvinyl halides the alpha, beta, or delta polymers of vinyl chloride, and polyvinyl bromide in a plasticized or unplasticized state.

In order that the invention may be better understood, reference is made to the accompanying drawing in which the sole figure shows a section of an article made by the method of this invention, said article consisting of a layer of plasticized gamma polyvinyl chloride adhered directly to a butadiene copolymer such as a copolymer of 75 parts of butadiene and 25 parts of acrylic nitrile.

In the simplest modification of this invention, a layer of polyvinyl halide is applied to a layer of a vulcanizable copolymer of butadiene and an unsaturated nitrile composition and the composite product is treated under pressure until the copolymer is vulcanized. If desired, however, either the polyvinyl halide or the copolymer may be employed in the form of a cement. A cement of the copolymer, or less preferably of the polyvinyl halide, may be applied to a film of the copolymer and allowed to dry partially before the film of polyvinyl halide is applied. Instead of using a cement, the surface of the copolymer film may also be treated with a solvent to render the surface more tacky. These further treatments are not essential for good adhesion is obtained, as described above, by merely curing the copolymer in contact with a polyvinyl halide surface. Better adhesion and more consistent results are ordinarily obtained, however, by the use of a tackifying agent or a cement.

As a specific embodiment of the invention, the following compositions were prepared:

*Vulcanizable copolymers*

| | Parts by weight |
|---|---|
| Perbunan* | 100 |
| Gas black | 80 |
| Zinc oxide | 5 |
| Coumarone resin | 10 |
| Sulfur | 2 |
| Accelerator | 2 |
| Dibutyl phthalate | 30 |

*A commercially-available material believed to be a copolymer of about 75 parts of butadiene and 25 parts of acrylic nitrile.

*Plasticized gamma polyvinyl chloride*

| | Parts by weight |
|---|---|
| Gamma polyvinyl chloride | 60.3 |
| Dibutyl phthalate | 37.7 |
| Lead silicate (stabilizer) | 2 |

Contiguous sheets of the plasticized gamma polyvinyl chloride and the vulcanizable copolymer were heated under pressure for 30 min. at 307° F. to cure the polymer. A strongly-adherent composite article was formed.

Even better results were obtained when the copolymer was tackified with a solvent consisting of 30 parts of dibenzyl ether and 70 parts of methyl ethyl ketone prior to being placed in contact with the polyvinyl halide.

In one useful modification of this invention, the plasticized gamma polyvinyl chloride is applied as a calendered or tubed coating to a sheet or tube of the copolymer to produce, after vulcanization, a product made principally of the copolymer but possessing the excellent resistance to sunlight and ozone characteristic of polyvinyl chloride.

Although we have herein disclosed specific embodiments of our invention we do not wish to limit the invention solely thereto, for it will be obvious to those skilled in the art that many modifications and variations are within the spirit and scope of the invention as defined in the appended claims.

We claim:

1. A composite article comprising a layer of plasticized gamma polyvinyl chloride and an adherent contiguous vulcanized layer of a copolymer of butadiene and an unsaturated nitrile having the structural formula $$CH_2=C-CN$$
$$|$$
$$R$$

wherein R represents a member of the class consisting of hydrogen and alkyl groups, said article having been formed by vulcanizing said copolymer layer in direct contact with said plasticized gamma polyvinyl chloride layer.

2. A composite article comprising a layer of plasticized gamma polyvinyl chloride and a contiguous vulcanized layer of a copolymer of butadiene and acrylic nitrile adhering thereto, said article having been formed by vulcanizing said copolymer layer in direct contact with said plasticized gamma polyvinyl chloride layer.

3. The method of adhering plasticized gamma polyvinyl chloride to a copolymer of butadiene and an unsaturated nitrile having the structural formula $$CH_2=C-CN$$
$$|$$
$$R$$

wherein R represents a member of the class consisting of hydrogen and alkyl groups which comprises heating under pressure until vulcanization occurs a vulcanizable copolymer of butadiene and the unsaturated nitrile in contact with the polyvinyl halide surface.

4. The method of adhering plasticized gamma polyvinyl chloride to a copolymer of butadiene and acrylic nitrile which comprises heating under pressure until vulcanization occurs a vulcanizable copolymer of butadiene and acrylic nitrile composition in contact with the polyvinyl halide surface.

BENJAMIN S. GARVEY.
DONALD E. HENDERSON.